United States Patent
Wang

(10) Patent No.: US 10,417,106 B2
(45) Date of Patent: Sep. 17, 2019

(54) SYSTEM FOR SHARING PROCESSED DATA BETWEEN SOFTWARE APPLICATIONS

(71) Applicant: HONGFUJIN PRECISION ELECTRONICS (TIANJIN) CO., LTD., Tianjin (CN)

(72) Inventor: Shih-Cheng Wang, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 133 days.

(21) Appl. No.: 15/636,552

(22) Filed: Jun. 28, 2017

(65) Prior Publication Data

US 2018/0329809 A1  Nov. 15, 2018

(30) Foreign Application Priority Data

May 15, 2017 (CN) .......................... 2017 1 0338339

(51) Int. Cl.
*G06F 11/00* (2006.01)
*G06F 11/30* (2006.01)
*G06F 11/36* (2006.01)
*G01K 17/00* (2006.01)

(52) U.S. Cl.
CPC ...... *G06F 11/3058* (2013.01); *G06F 11/3044* (2013.01); *G06F 11/3604* (2013.01); *G06F 11/3688* (2013.01); *G01K 17/00* (2013.01)

(58) Field of Classification Search
CPC . G01K 17/00; G06F 11/3688; G06F 11/3044; G06F 11/3058; G06F 11/3604
See application file for complete search history.

(56) References Cited

U.S. PATENT DOCUMENTS

| | | | | |
|---|---|---|---|---|
| 6,578,090 B1* | 6/2003 | Motoyama | ............ | G06F 9/4488 719/315 |
| 6,691,175 B1* | 2/2004 | Lodrige | ................. | G06F 9/546 718/102 |
| 2003/0065784 A1* | 4/2003 | Herrod | ................. | H04W 28/18 709/227 |
| 2013/0205022 A1* | 8/2013 | Kagan | ..................... | H04L 67/06 709/224 |
| 2015/0332463 A1* | 11/2015 | Galera | ............... | G06K 9/00771 382/103 |
| 2016/0239723 A1* | 8/2016 | Ge | ..................... | G06K 9/00771 |

* cited by examiner

*Primary Examiner* — Joseph D Manoskey
(74) *Attorney, Agent, or Firm* — ScienBiziP, P.C.

(57) ABSTRACT

A system includes a first software module, a storage module and a second software module. The first software module receives first data and analyzes the first data to obtain first processed data corresponding to the first data. The storage module stores the first processed data. The second software module receives second data and obtains values in first processed data corresponding to parameters of the second software module, and analyzes the obtained values and the second data to obtain second processed data.

20 Claims, 4 Drawing Sheets

SYSTEM FOR SHARING PROCESSED DATA BETWEEN SOFTWARE APPLICATIONS

CROSS-REFERENCE TO RELATED APPLICATIONS

This application claims priority to Chinese Patent Application No. 201710338339.6, filed on May 15, 2017, the contents of which are incorporated by reference herein.

FIELD

The subject matter herein generally relates to obtaining data of software, especially relates to system for sharing processed data between software applications.

BACKGROUND

When associated software applications, for example, heat flow analyzing software such as Fire Dynamics Simulator (FDS), and structure analyzing software such as PHOENICS are running, parameters of each application are manually inputted.

BRIEF DESCRIPTION OF THE DRAWINGS

Implementations of the present technology will now be described, by way of example only, with reference to the attached figures.

DETAILED DESCRIPTION

Figure 1:
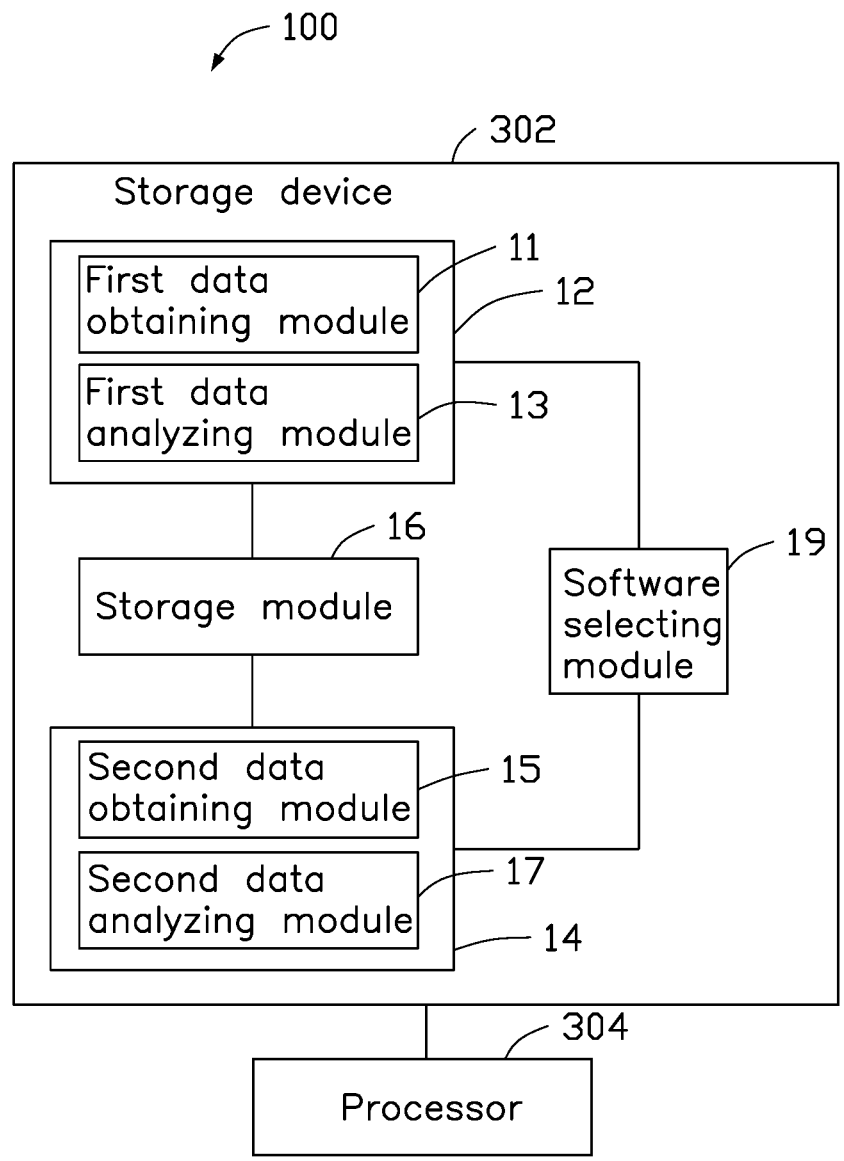
FIG. 1 is a block diagram of a system for sharing processed data between software applications according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

A definition that applies throughout this disclosure will now be presented.

The term "comprising" means "including, but not necessarily limited to"; it specifically indicates open-ended inclusion or membership in a so-described combination, group, series, and the like.

Figure 2:
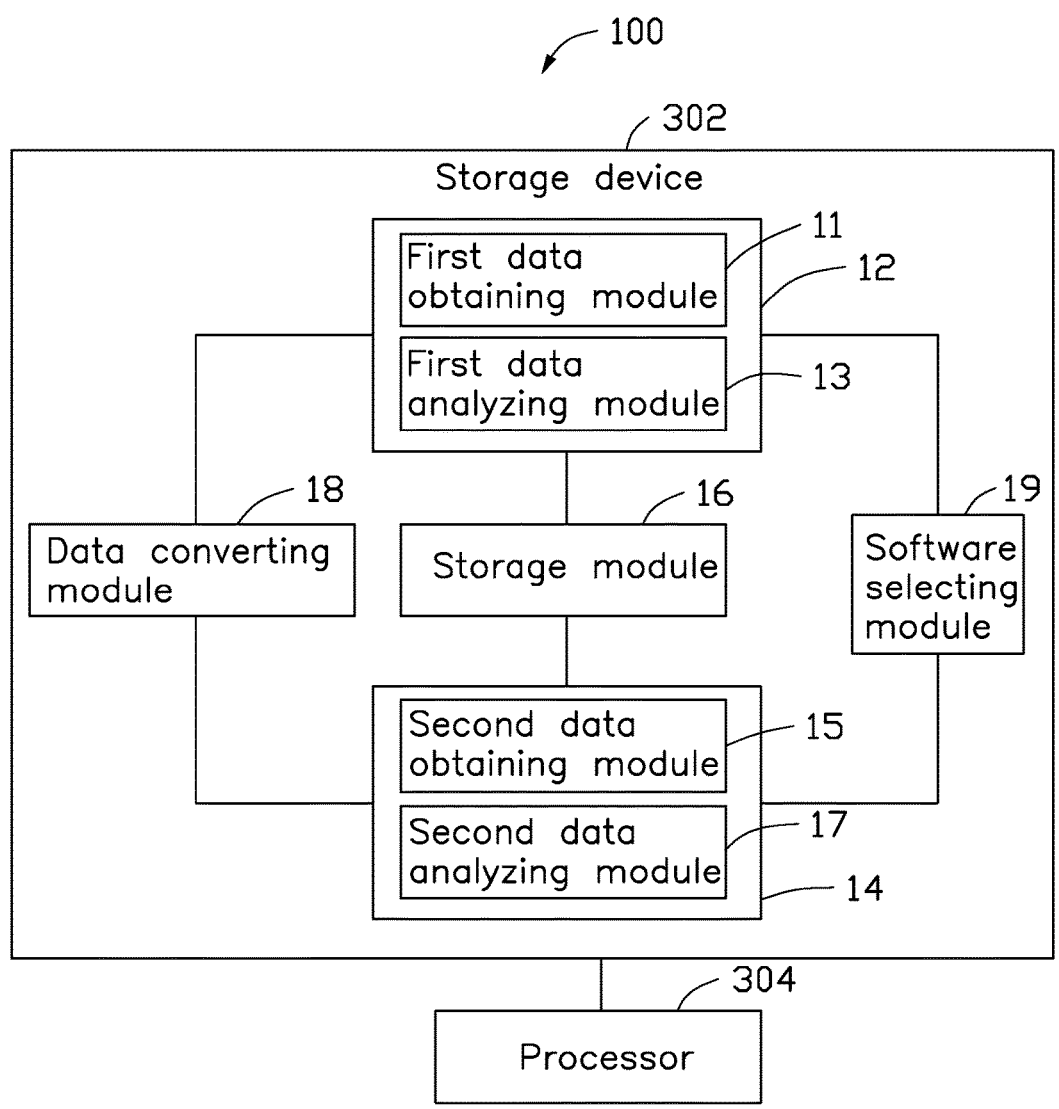
FIG. 2 is a block diagram of a system for sharing processed data between software applications according to a second exemplary embodiment.

FIGS. 1 and 2 each illustrate a system for sharing processed data between software applications 100. The system 100 includes a first software module 12, a second software module 14 and a storage module 16. The first software module 12 includes a first data obtaining module 11 and a first data analyzing module 13. The first data obtaining module 11 obtains first software parameter values corresponding to first software parameters for executing the first software module 12. In an embodiment, in respond to a user operation, the first software module 12 displays a first parameter input interface including the first software parameter for inputting the first software parameter value. Based on the first software parameter value, the first data analyzing module 13 analyzes data to obtain first processed data. The first processed data includes a number of a first result parameters and a number of first result values corresponding to the first result parameters. The storage module 16 stores the first processed data.

The second software module 14 includes a second data obtaining module 15 and a second data analyzing module 17. The second data obtaining module 15 obtains second software parameter values corresponding to second software parameters for running the second software module 14. The second software module 14 is associated with the first software module 12. The first processed data includes at least one first result parameter which is the same as a second software parameter (hereinafter "cross-matching parameter"). When the second data obtaining module 15 obtains the second software parameter values, the cross-matching parameter is automatically obtained. In an embodiment, in response to a user operation, the second software module 14 displays a second parameter input interface including the second software parameter for inputting the second software parameter value. Based on the first result parameter obtained by the second data obtaining module 15 and other second software parameter values, the second data analyzing module 13 analyzes data to obtain second processed data. The storage module 16 stores the second processed data.

The system 100 further includes a software selecting module 19. The software selecting module 19 provides a software selecting interface for the user to select a software application. Selectable software includes the first software module 12 and the second software module 14.

There are multiple units within the cross-matching parameter, as the unit of the first result parameter is different to that of the second software parameter. The system 100 further includes a data converting module 18. The data converting module 18 converts the multiple units of the cross-matching parameter into one unit, that is, into the unit of the second software parameter. In another embodiment, the cross-matching parameter has a single unit and the system 100 does not include the data converting module 18.

Figure 3:
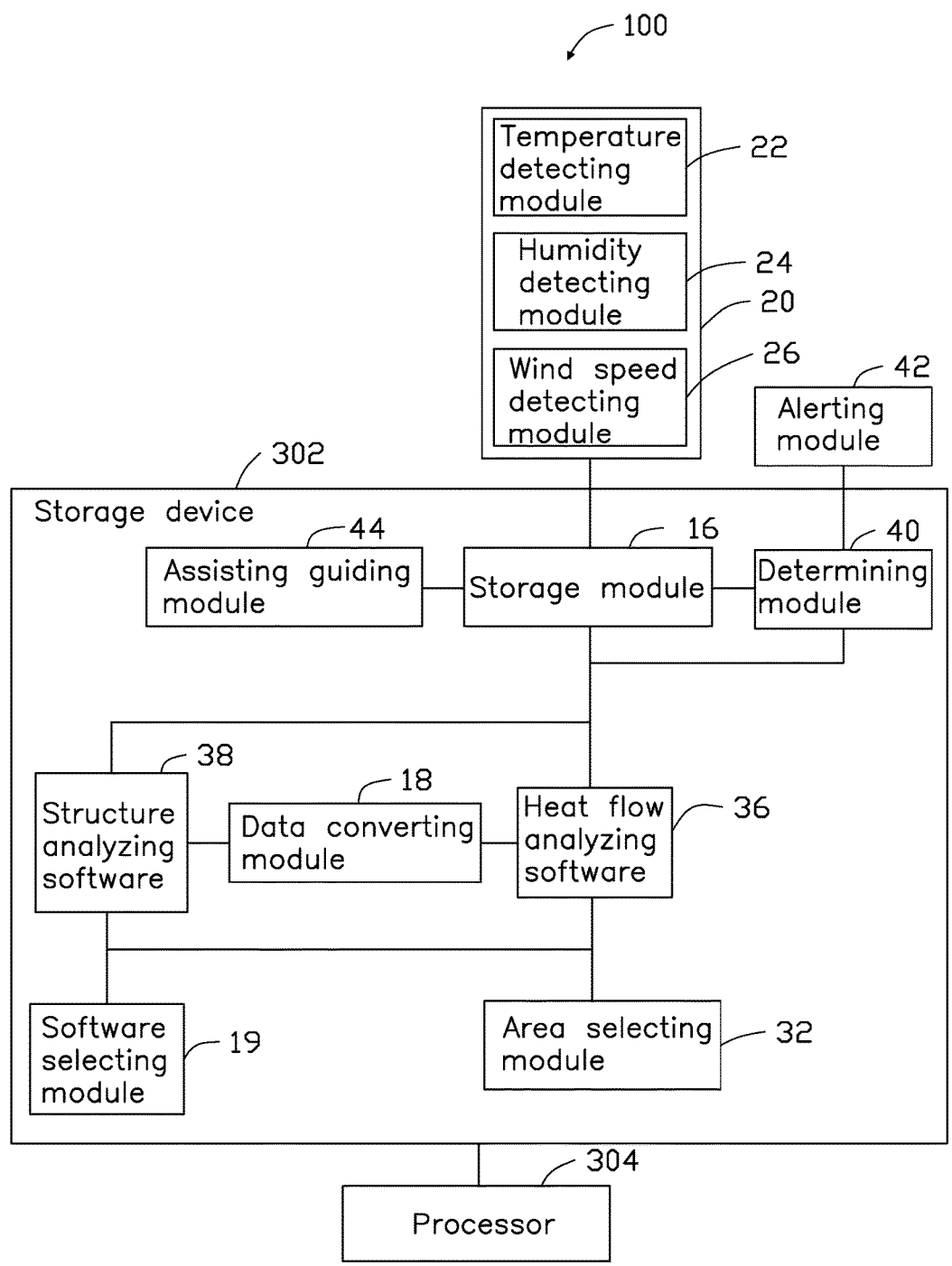
FIG. 3 is a block diagram of a system for sharing processed data between software applications according to a third exemplary embodiment.
Figure 4:
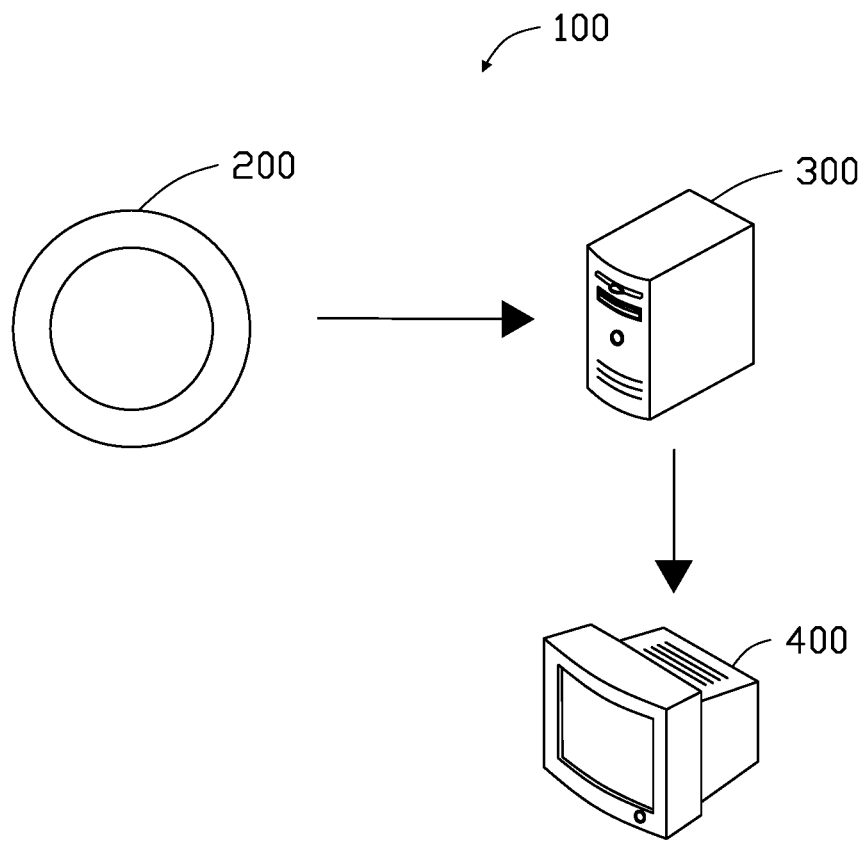
FIG. 4 is a schematic diagram of the system for sharing processed data between software applications of FIG. 3.

FIGS. 3 and 4 illustrate the first software module 12 as a heat flow analyzing software 36 (for example, FDS). The second software module 14 can be a structure analyzing software 38 (for example, PHOENICS). Based on an environment situation of a monitored area 200, the heat flow analyzing software 36 and the structure analyzing software 38 analyze a safety condition of the monitored area 200. The system 100 further includes an environment detecting device 20 and an area selecting module 32.

The environment detecting device 20 is configured to detect the environment data of the monitored area 200. The environment data includes temperature, humidity, and wind speed or intensity. The environment detecting device 20 includes a temperature detecting module 22, a humidity detecting module 24, and a wind speed detecting module 26. The temperature detecting module 22 detects temperature of the monitored area 200. The humidity detecting module 24 detects humidity of the monitored area 200. The wind speed detecting module 26 detects wind speed of the monitored area 200. The storage module 16 further stores the environment data. The system 100 includes a server 300. The server 300 includes a storage device 302 and a processor 304. The storage device 302 stores programs of the first software module 12, the second software module 14, the storage module 16 and programs of other modules of the server 300. The processor 304 calculates and processes various types of data of the programs in the storage device 302.

The area selecting module 32 is configured to select the monitored area 200. In an exemplary embodiment, the area selecting module 32 provides an area selecting interface for a worker to select the monitored area 200. The area selecting interface includes at least one monitored area 200. The area selecting interface can include two or more monitored areas 200. In an exemplary embodiment, the server 300 includes the area selecting module 32 and the software selecting module 19. In another exemplary embodiment, the system 100 further includes a monitoring center 400 communicating with the server 300. The monitoring center 400 includes the selecting module 32 and the software selecting module 19.

The storage module 16 further stores engineering data of the monitored area 200. The engineering data includes engineering drawings. The heat flow analyzing software 36 obtains environment data corresponding to parameter of the heat flow analyzing software 36 from the storage module 16. Based on obtained environment data, the engineering data, and data which is manually input to the heat flow analyzing software 36, the heat flow analyzing software 36 analyzes heat flow condition of the monitored area 200 to obtain heat flow data (the first processed data). The storage module 16 further stores the first processed data. The first processed data includes at least one first visual picture. The heat flow analyzing software 36 is executed in the server 300.

The structure analyzing software 38 obtains the first result value corresponding to the cross-matching parameter from the first processed data, and Based on obtained first result value, the engineering data, and data which is manually inputted to the structure intensity analyzing software 38, analyzes structure condition of the monitored area 200 to obtain second processed data. The storage module 16 further stores the second processed data. The second processed data includes at least one second visual picture. The structure analyzing software 38 is executed in the server 300.

In an exemplary embodiment, a cross-matching parameter of the heat flow analyzing software 36 and the structure intensity analyzing software 38 has multiple units. Based on the environment data (for example, temperature), the engineering data, and data which is manually input to the heat flow analyzing software 36, the heat flow analyzing software 36 analyzes a heat flow of the monitored area 200 to obtain the first processed data. The data converting module 18 converts the multiple units of the cross-matching parameter in the first processed data to the units of second software parameter in the structure intensity analyzing software 38. Based on the converted value, the engineering data, and the data which is manually input to the structure intensity analyzing software 38, the structure intensity analyzing software 38 can analyze the structure of the monitored area 200 in the heat flow of the monitored area 200.

The system 100 further includes a determining module 40. The storage module 16 further stores threshold values of parameters of each structure of the monitored area 200. Based on the threshold values and the second processed data, the determining module 40 can determine safety levels of the monitored area 200. The safety levels include safe and dangerous conditions. The structure intensity analyzing software 38 analyzes respective strengths and integrities of structures of the monitored area 200. The threshold value is a structural or catastrophic failure point of each structure. Based on the respective strengths and integrities of structures analyzed, and the threshold value, the determining module 40 determines whether the structures of the monitored area 200 are safe.

The system 100 further includes an alerting module 42. When the selected monitored area 200 is deemed unsafe, the alerting module 42 outputs an alert concerning the monitored area 200. The alerting module 42 is executed in the monitoring center 400. When the selected monitored area 200 or a structure within it is deemed dangerous, the monitoring center 400 displays a warning.

The system 100 further includes an assisting guiding module 44. Based on a picture of a scene of a fire and a number of analyzing data including other visual pictures, the assisting guiding module 44 analyzes which visual picture is most appropriate as the picture of the and displays that visual picture. Based on the analyzing data of the visual picture, a supervisor can know information of the scene of fire and guide a rescue operation. The assisting guiding module 44 is executed in the server 300. The picture of a scene of a fire is sent from an electronic device communicating with the server 300. The electronic device can be a mobile phone.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A system for sharing processed data comprising:
a server comprising:
a storage device that stores programs of a first engineering software, a second engineering software, and a storage module;
at least one processor, wherein the programs, when executed by the at least one processor, cause:
the first engineering software to receive first data and analyze the first data to obtain first processed data corresponding to the first data;
the storage module to store the first processed data; and
the second engineering software to receive second data and obtain values in the first processed data corresponding to parameters of the second software module, and analyze the obtained values and the second data to obtain second processed data.

2. The system as claimed in claim 1, wherein the storage device further comprises a program of a software selecting module, the software selecting module provides a user interface for selecting software applications, selectable software applications comprise the first engineering software and the second engineering software.

3. The system as claimed in claim 1, wherein the system further comprises an environment detecting device, the environment detecting device detects environment data of a monitored area, the first data comprises values of the environment data corresponding to the first software module.

4. The system as claimed in claim 3, wherein the storage device further stores threshold values of parameters of the monitored area and a program of a determining module, based on the threshold values of parameters and processed data obtained by the selected software, the determining module determines a safety level of the monitored area.

5. The system as claimed in claim 4, wherein the safety level comprises safe and dangerous conditions.

6. The system as claimed in claim 3, wherein the storage device further comprises a program of an area selecting module, the selecting module provides an area selecting interface for selecting the monitored area.

7. The system as claimed in claim 3, wherein the environment data comprises temperature, the environment detecting module comprises a temperature detecting module, the temperature detecting module detects the temperature of the monitored area.

8. The system as claimed in claim 1, wherein units of same parameter in the first software module and the second software module are different, the storage device further comprises a program of a data converting module, the data converting module converts the unit of the parameter in the first processed data corresponding to the parameter in the second software module to the unit of the parameter in the second software module.

9. The system as claimed in claim 1, wherein the first software module is a heat flow analyzing software, the second software module is a structure analyzing software.

10. The system as claimed in claim 1, further comprising an electronic device communicating with the server, wherein the storage device further comprises a program of an assisting guiding module and visual pictures, based on a picture of a fire scene from the electronic device and the visual pictures, the assisting guiding module analyzes which visual picture is most appropriate as the picture of the fire scene and displays that visual picture.

11. A system for sharing processed data comprising:
a server comprising:
a storage device that stores programs of a first engineering software, a second engineering software, and a storage module;
at least one processor, wherein the programs, when executed by the at least one processor, cause:
the first engineering software to provide a first interface for inputting first data and analyze the first data to obtain first processed data corresponding to the first data;
the storage module to store the first processed data; and
the second engineering software to provide a second interface for inputting second data and obtain values in first processed data corresponding to parameters of the second software module, and analyze the obtained values and the second data to obtain second processed data.

12. The system as claimed in claim 1, wherein the storage device further comprises a program of a software selecting module, the software selecting module provides a user interface for selecting software applications, selectable software applications comprise the first engineering software and the second engineering software.

13. The system as claimed in claim 11, wherein the system further comprises an environment detecting device, the environment detecting device detects environment data of a monitored area, the first data comprises values of the environment data corresponding to the first software module.

14. The system as claimed in claim 13, wherein the storage device further stores threshold values of parameters of the monitored area and a program of a determining module, based on the threshold values of parameters and processed data obtained by the selected software, the determining module determines a safety level of the monitored area.

15. The system as claimed in claim 14, wherein the safety level comprises safe and dangerous conditions.

16. The system as claimed in claim 13, wherein the storage device further comprises a program of an area selecting module, the selecting module provides an area selecting interface for selecting the monitored area.

17. The system as claimed in claim 13, wherein the environment data comprises temperature, the environment detecting module comprises a temperature detecting module, the temperature detecting module detects the temperature of the monitored area.

18. The system as claimed in claim 11, wherein units of same parameter in the first software module and the second software module are different, the storage device further comprises a program of a data converting module, the data converting module converts the unit of the parameter in the first processed data corresponding to the parameter in the second software module to the unit of the parameter in the second software module.

19. The system as claimed in claim 11, wherein the first software module is a heat flow analyzing software, the second software module is a structure analyzing software.

20. The system as claimed in claim 11, further comprising an electronic device communicating with the server, wherein the storage device further comprises a program of an assisting guiding module and visual pictures, based on a picture of a fire scene from the electronic device and the visual pictures, the assisting guiding module analyzes which visual picture is most appropriate as the picture of the fire scene and displays that visual picture.

* * * * *